W. H. PIKE, Jr.
CLUTCH DEVICE.
APPLICATION FILED JULY 12, 1905.

912,165.

Patented Feb. 9, 1909.

Witnesses
J. G. Strinkel
B. C. Rust

Inventor
William H. Pike Jr.
by
Finks, Freeman & Watson,
Attorneys

UNITED STATES PATENT OFFICE.

WILLIAM H. PIKE, JR., OF ORANGE, NEW JERSEY, ASSIGNOR TO PIKE ADDING MACHINE COMPANY, OF ORANGE, NEW JERSEY, A CORPORATION OF NEW JERSEY.

CLUTCH DEVICE.

No. 912,165.   Specification of Letters Patent.   Patented Feb. 9, 1909.

Application filed July 12, 1905. Serial No. 269,365.

*To all whom it may concern:*

Be it known that I, WILLIAM H. PIKE, Jr., a citizen of the United States, residing at Orange, in the county of Essex and State of New Jersey, have invented certain new and useful Improvements in Clutch Devices, of which the following is a specification.

My invention relates to means for imparting rotation to the working shaft of a machine and consists of devices whereby to insure a positive connecting and release of the driven and driving parts, to prevent improper rotation of the driven parts and provide means for preventing injury on an undue resistance of the driven parts, as fully set forth hereafter and as illustrated in the accompanying drawings, in which—

Figure 1:
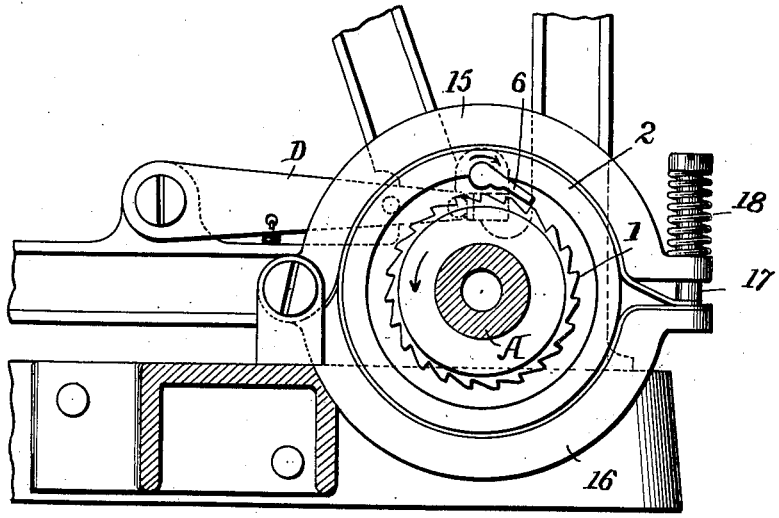
Figure 2:
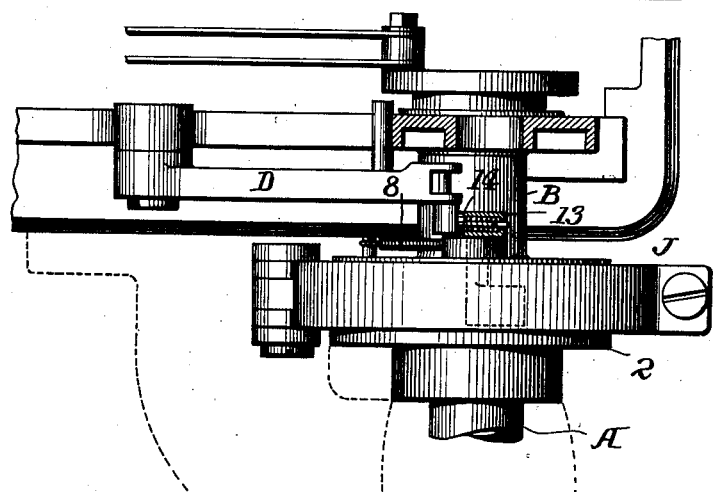
Figure 3:
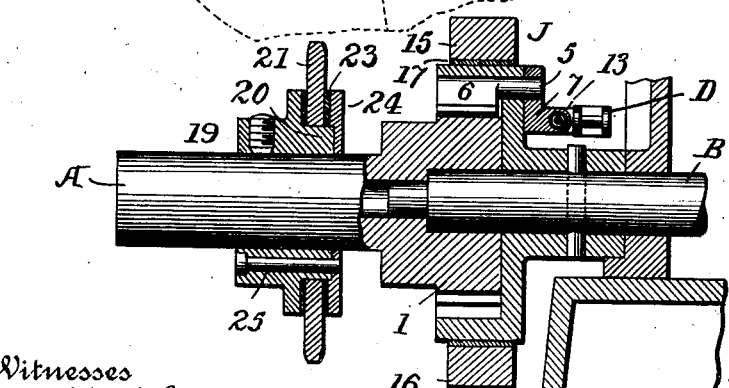

Figure 1 is an end view of a driving gear embodying my improvements; Fig. 2 is a plan; Fig. 3 is a side view in part section.

In certain classes of machines, it is necessary to effect operations by a single complete rotation of a working shaft, requiring it to be arrested at the end of each rotation while the driving shaft continues its rotation. The connections between the two shafts are sometimes frictional which as usually made lack in positiveness and consume an undue amount of energy, and while a positive connection is desirable it is difficult to connect and detach the parts, especially when driven at a high speed, without shocks and noise. To secure a positive drive, but a practically shockless and noiseless arrest, I provide a clutch device as follows.

The driving shaft A is intended to rotate continuously in the direction of its arrow, and carries a toothed or ratchet wheel 1. The driven shaft B is axially in line with the driving shaft and is provided with a muff 2 enveloping the toothed wheel, and through this muff, parallel to the axis of the shaft, extends a rock shaft 5 on one end of which is a pawl 6 adapted to engage the teeth of the wheel 1, when the two shafts are to turn together, and at the opposite end of the rock shaft is an arm 7 in position to strike the end of a detent D pivoted to the frame, when the shaft 5 will be so rocked as to carry the pawl from contact with the toothed wheel.

A spring 8 connected to a stud at the side of the muff and to the arm 7 tends to rock the shaft 5 in the direction of its arrow Fig. 1 and throw the pawl into engagement with the wheel 1, and when at the end of a rotation, the arm 7 strikes the end of the detent, the pawl 6 is lifted and the driven shaft comes to rest.

It is important that the pawl shall not only be lifted from the engaging part of the driving member, but that it shall be fully held out of engagement avoiding any possible misconnection or any rattling. To effect this, I provide a spring so arranged as to be compressed when the arm is brought in contact with the detent and thereafter by its expansion serving to lift the pawl to its full extent. Thus the arm 7 carries a spring 13 bearing on the head of a pin 14 arranged so as to strike a lug on the detent D, whereby the spring is then compressed and thereafter the spring by its expansion will turn back the arm, rock the shaft, and lift and hold the pawl out of contact with the ratchet. When this occurs, the driven member of the clutch is arrested while the rotation of the driver continues.

I apply a friction brake J to the driven shaft or part connected therewith, of such power that said shaft cannot be turned by any stored energy in the parts to which the driven shaft A may be connected, but which is capable of being readily overcome by the power of the driver. A back rotation of the shaft A cannot therefore carry the lug on the detent D away from the arm 7. While such friction brake J may be formed in different ways I prefer to make use of a clamp ring in two sections, 15, 16, lined with any suitable anti-friction lining 17 which may be brought to bear by means of an adjustable spring 18 upon the outside of the muff 2 so as to resist the rotation of the latter to an extent proportionate to the compression of the spring.

It is sometimes desirable to provide means whereby the driving shaft of the clutch may have a slip in case of a sudden or undue resistance in the parts driven. To provide for this, I mount upon the driving shaft a hub 19 having a collar 20 receiving a sprocket or other gear wheel 21, and between the said sprocket and the parallel face of the hub I place a disk of friction material such as a fiber packing, and I clamp a similar disk 23 against the other side of the sprocket by means of a plate 24 and screws 25, thereby clamping the sprocket with any desired pressure and creating any desired frictional resistance to the rotation of the sprocket or other gear when the same is driven from any suitable source of power.

Without limiting myself to the precise construction and arrangement of parts shown, I claim—

1. In a clutch device, the combination of a driving member, a driven member, a pawl upon one of the members engaging the other, a movable detent, and a spring connected with the pawl to contact with the detent and acting when compressed to carry the pawl from the contacting member, substantially as set forth.

2. The combination with the driving and driven rotative members of a clutch device, of a pawl carried by one member and engaging the other, a spring on the pawl, and a movable detent arranged to make contact with said spring to release the pawl, substantially as set forth.

3. In a clutch device, the combination of a driving member, a driven member, a rock shaft carried by the driven member, a pawl carried by the shaft and adapted to engage the driving member, a detent, an arm on the rock shaft, and a spring pressed pin carried by said arm and adapted to contact with the detent and rock the shaft to lift the pawl from the driving member.

In testimony whereof I have signed my name to this specification in the presence of two subscribing witnesses.

WILLIAM H. PIKE, Jr.

Witnesses:
  E. G. LANGHORNE,
  JNO. T. LANGHORNE.